United States Patent
Dinan et al.

(10) Patent No.: US 12,002,015 B1
(45) Date of Patent: Jun. 4, 2024

(54) METHODS AND SYSTEMS FOR DYNAMIC ROUTING OF ELECTRONIC TRANSACTION MESSAGES

(71) Applicant: Worldpay, LLC, Symmes Township, OH (US)

(72) Inventors: Stephen E. Dinan, Austin, TX (US); James S. Osborn, Austin, TX (US); William J. Wied, Austin, TX (US)

(73) Assignee: Worldpay, LLC, Symmes Township, OH (US)

( * ) Notice: Subject to any disclaimer, the term of this patent is extended or adjusted under 35 U.S.C. 154(b) by 569 days.

(21) Appl. No.: 16/697,818

(22) Filed: Nov. 27, 2019

(51) Int. Cl.
*G06Q 30/00* (2023.01)
*G06Q 20/04* (2012.01)
*G06Q 20/10* (2012.01)
*G06Q 20/12* (2012.01)

(52) U.S. Cl.
CPC ............. *G06Q 20/04* (2013.01); *G06Q 20/10* (2013.01); *G06Q 20/12* (2013.01)

(58) Field of Classification Search
None
See application file for complete search history.

(56) References Cited

U.S. PATENT DOCUMENTS

| | | | | |
|---|---|---|---|---|
| 8,630,948 | B1 * | 1/2014 | Hildebrand | G06Q 40/02 705/40 |
| 10,002,348 | B1 * | 6/2018 | Doctor | G06Q 20/02 |
| 10,268,991 | B1 | 4/2019 | Davison | |
| 11,080,711 | B2 * | 8/2021 | Levy | G06Q 10/06395 |
| 11,282,075 | B1 * | 3/2022 | Kettler | G06Q 20/40 |
| 2003/0055783 | A1 * | 3/2003 | Cataline | G06Q 20/00 705/40 |
| 2007/0233597 | A1 * | 10/2007 | Petersen | G06Q 20/10 705/39 |
| 2007/0282741 | A1 * | 12/2007 | Kumar | G06Q 20/105 705/40 |
| 2009/0164330 | A1 * | 6/2009 | Bishop | G06Q 20/02 705/19 |
| 2015/0178708 | A1 * | 6/2015 | Reutov | G06Q 20/10 705/44 |
| 2017/0364915 | A1 * | 12/2017 | Levy | G06Q 20/405 |

FOREIGN PATENT DOCUMENTS

| | | | | |
|---|---|---|---|---|
| CN | 110945834 | A * | 3/2020 | ............. G06Q 20/40 |
| WO | WO-2010106395 | A1 * | 9/2010 | ............. G06Q 20/04 |
| WO | WO-2016084074 | A1 * | 6/2016 | ......... G06Q 10/0639 |

OTHER PUBLICATIONS

DeGennaro, Ramon P. "Credit card processing: a look inside the black box." Economic Review 91.1 (2006): 27-42. (Year: 2006).*

* cited by examiner

*Primary Examiner* — Michael Bekerman
(74) *Attorney, Agent, or Firm* — Bookoff McAndrews, PLLC

(57) ABSTRACT

Systems and methods are disclosed for dynamic routing of electronic transactions. One method comprises receiving a request message from a merchant system and determining a routing directive associated with the request message. Upon determining the routing directive, contextual data may be retrieved based on the routing directive. Then, a final destination payment processor may be determined based on the routing directive and the contextual data. The request message may be updated based on the final destination payment processor. The updated request message may then be transmitted to a downstream entity for further processing.

20 Claims, 12 Drawing Sheets

| MESSAGE TYPE | ROUTING DIRECTIVE TYPE | ERROR TYPE (STATUS CODE) | DESTINATION SELECTION CRITERIA |
|---|---|---|---|
| MESSAGES ORIGINATING FROM MERCHANT SYSTEM ASSOCIATED WITH MID = (****) | ERROR-BASED | 300 | CONNECTIVITY ERROR RATE, RESPONSE TIME WITHIN LAST 3 HOURS |
| | | 302 | CONNECTIVITY ERROR RATE, RESPONSE TIME WITHIN LAST 3 HOURS |
| | | 400 | PROCESSOR ERROR RATE, RESPONSE TIME WITHIN LAST 3 HOURS |
| | | 402 | PROCESSOR ERROR RATE, RESPONSE TIME WITHIN LAST 3 HOURS |
| | | 404 | PROCESSOR ERROR RATE, RESPONSE TIME WITHIN LAST 3 HOURS |
| MESSAGES ORIGINATING FROM MERCHANT SYSTEM ASSOCIATED WITH MCC = (***) | NON-ERROR-BASED | N/A | AVERAGE RESPONSE TIME BETWEEN NOW AND 2 HOURS PRIOR, LEAST COST |
| ALL MESSAGES | NON-ERROR-BASED | N/A | PERCENTAGE SPLIT ROUTING BETWEEN CANDIDATES BASED ON CONNECTIVITY ERROR RATE, PROCESSOR ERROR RATE, RESPONSE TIME WITHIN LAST 2 HOURS |
| ALL MESSAGES | NON-ERROR-BASED | N/A | SPLIT ROUTING BETWEEN CANDIDATES BASED ON PEAK TIMEFRAMES THROUGHOUT THE DAY |

*FIG. 4*

| PAYMENT PROCESSOR | STATUS LOCATION | STATUS CODE | STATUS TIME |
|---|---|---|---|
| PAYMENT PROCESSOR A | CONNECTIVITY STATUS | 300 | 14:23:45 |
| | | 300 | 14:24:56 |
| | | 302 | 04:25:32 |
| | PROCESSOR STATUS | 302 | 06:11:43 |
| | | 400 | 01:13:33 |
| | | 400 | 01:17:35 |
| PAYMENT PROCESSOR B | CONNECTIVITY STATUS | 300 | 16:23:45 |
| | | 301 | 16:24:12 |
| | PROCESSOR STATUS | 400 | 02:13:13 |
| | | 402 | 04:12:11 |
| | | 402 | 04:12:45 |
| | | 404 | 01:56:25 |
| ⋮ | | | ⋮ |

FIG. 5

| PAYMENT PROCESSOR | REQUEST TIME | RESPONSE TIME |
|---|---|---|
| PAYMENT PROCESSOR A | 14:23:43 | 14:23:45 |
| | 14:24:12 | 14:24:14 |
| | 14:28:33 | 14:28:34 |
| PAYMENT PROCESSOR B | 14:23:46 | 14:23:51 |
| | 14:23:55 | 14:24:03 |
| | 14:24:05 | 14:24:13 |
| ... | ... | ... |

*FIG. 6*

METHODS AND SYSTEMS FOR DYNAMIC ROUTING OF ELECTRONIC TRANSACTION MESSAGES

TECHNICAL FIELD

The present disclosure relates to methods and systems for electronic transaction processing. More particularly, the technologies described herein relate to the field of electronic transaction message routing.

BACKGROUND

As demand for software-based electronic payment processing services continues to increase, consumers (e.g., merchants) have become more sensitive to availability, redundancy, and scalability of those services. For instance, consumers may want to utilize services provided from a variety of transaction platforms (e.g., acquirers, payment processors, etc.), without the hassle of manually updating their systems for compliance and compatibility. Further, when a transaction platform becomes unresponsive or unreachable, consumers may want to access other transaction platforms that are operating properly without further delay. Furthermore, consumers may want to utilize a transaction platform that is most responsive and/or error-free among a multitude of available transaction platforms.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a computer-implemented method for dynamic routing of electronic transaction messages, comprising: receiving a request message from a merchant system; determining a routing directive associated with the request message; retrieving contextual data based on the routing directive; determining a final destination payment processor based on the routing directive and the contextual data; updating the request message based on the final destination payment processor; and transmitting the updated request message to a downstream entity.

One embodiment provides a system for dynamic routing of electronic transaction messages. The system may comprise one or more processors; and a non-transitory computer readable medium storing instructions which, when executed by the one or more processors, cause the one or more processors to perform a method comprising: receiving a request message from a merchant system; determining a routing directive associated with the request message; retrieving contextual data based on the routing directive; determining a final destination payment processor based on the routing directive and the contextual data; updating the request message based on the final destination payment processor; and transmitting the updated request message to a downstream entity.

One embodiment provides a non-transitory computer readable medium for dynamic routing of electronic transaction messages. The non-transitory computer readable medium may store instructions that, when executed by one or more processors, cause the one or more processors to perform a method comprising: receiving a request message from a merchant system; determining a routing directive associated with the request message; retrieving contextual data based on the routing directive; determining a final destination payment processor based on the routing directive and the contextual data; updating the request message based on the final destination payment processor; and transmitting the updated request message to a downstream entity.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4 depicts exemplary routing directives that may be configured via a portal of a DRS system, according to one aspect of the present disclosure.

FIG. 5 depicts exemplary contextual data that may be stored in a database of a DRS system, according to one aspect of the present disclosure.

FIG. 6 depicts another exemplary contextual data that may be stored in a database of a DRS system, according to one aspect of the present disclosure.

DETAILED DESCRIPTION OF EMBODIMENTS

Figure 1:
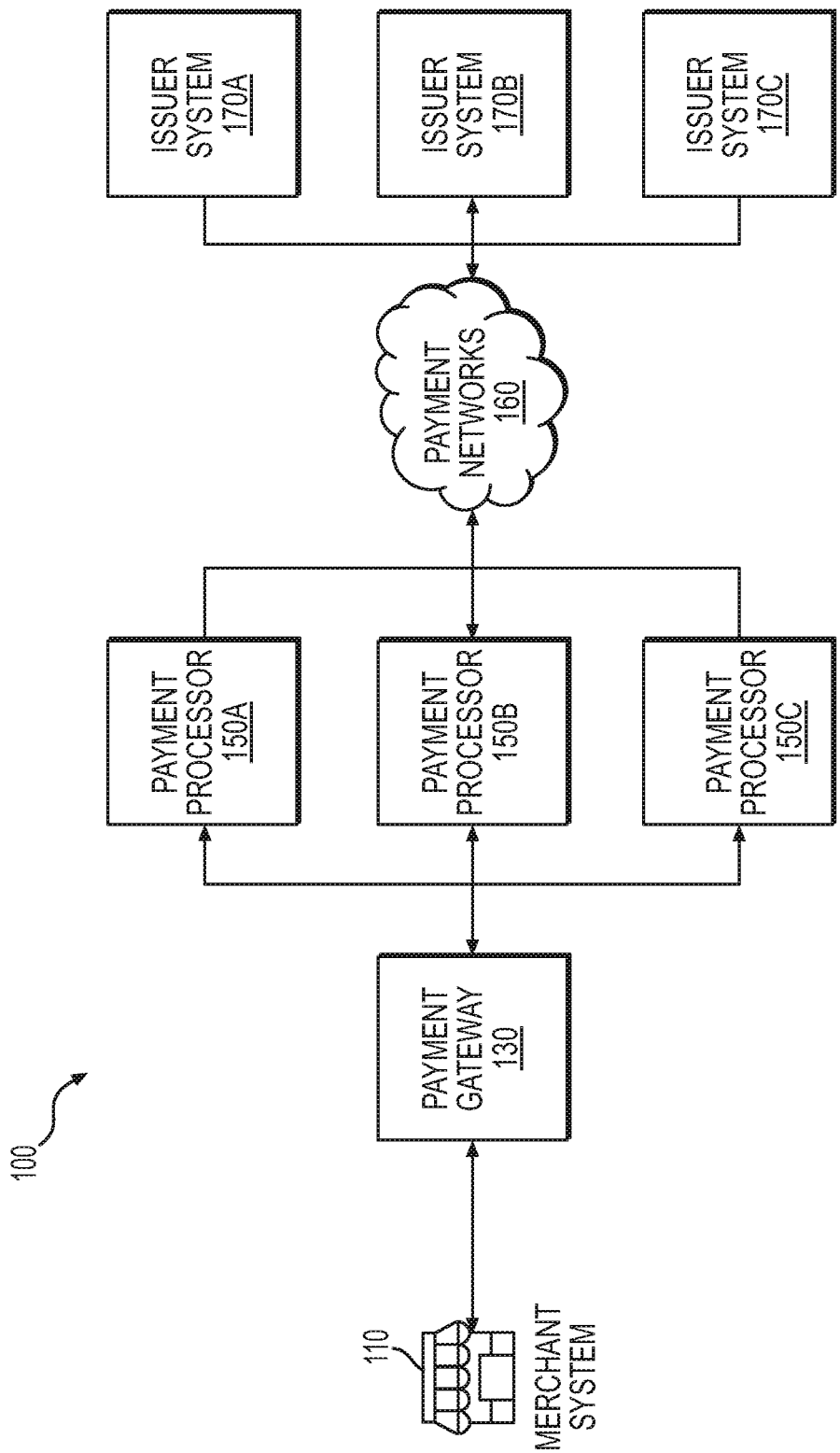
FIG. 1 depicts a block diagram of an exemplary payment system, according to one aspect of the present disclosure.

The following embodiments describe methods and systems for electronic transaction processing. More particularly, the technologies described herein relate to the field of electronic transaction message routing.

As demand for software-based electronic payment processing services continues to increase, consumers (i.e., clients such as, for example, merchants) have become more sensitive to availability, redundancy, and scalability of those services. To limit single points of failure, it may be prudent to evaluate calls for those services (i.e., request messages) to ensure there are multiple paths to successfully processing those calls, in the event that a processing or connection issue occurs with one or more services. To build this resiliency into interactions with transaction platforms, clients may need to create a specific logic configured to interpret failures and perform appropriate remedial actions. The remedial actions may comprise retrying the request against the same destination, modifying/updating the request to a different routing through the same destination, or trying the request against a different destination altogether.

To address the problems discussed above, dynamic routing service (DRS) system contemplated in the present disclosure may serve as a resiliency proxy service sitting between clients and transaction platforms they communicates with. The DRS system may alleviate the need for clients to programmatically build this logic themselves. Instead, clients may only need to configure desired remedial actions for differing conditions via a portal, and to point their respective endpoints (i.e., client systems such as, for example, merchant systems) to the DRS system.

The DRS system may be independent from both the clients and any transaction platforms they utilize, which may allow for hosting options to ensure that the DRS system can be reached successfully. The DRS system may be hosted in client data centers, in a cloud-based hosting service, or in other separate data centers. Further, the DRS system may be interface-agnostic (i.e., application programming interface (API)-agnostic, or platform-agnostic) as it may not be coded to specific interface specifications. Instead, the DRS system may be configuration-driven and may be able to determine which parts of request and response messages are significant and should be extracted.

Various non-limiting embodiments of the present disclosure will now be described to provide an overall understanding of the principles of the structure, function, and use of systems and methods disclosed herein for electronic transaction messaging conversion. One or more examples of these non-limiting embodiments are illustrated in the selected examples disclosed and described in detail with reference made to FIGS. 1-11 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

For simplicity, the description that follows will be provided by reference to a "payment vehicle," which generally refers to any type of financial alternative to currency. As is to be clear to those skilled in the art, no aspect of the present disclosure is specifically limited to a specific type of payment vehicle. Therefore, it is intended that the following description encompasses the use of the present disclosure with many other forms of financial alternatives to currency, including credit cards, debit cards, smart cards, single-use cards, pre-paid cards, electronic currency (such as might be provided through a cellular telephone or personal digital assistant), and the like. Payment vehicles can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A payment vehicle can also have electronic functionality provided by a network of electronic circuitry that is printed or otherwise incorporated onto or within the payment vehicle (and typically referred to as a "smart card"), or be a fob having a transponder and an RFID reader.

Referring now to the appended drawings, FIG. 1 depicts a block diagram of an exemplary payment system, according to one aspect of the present disclosure. In the payment system 100, a consumer can utilize a payment vehicle to initiate a transaction at merchant system 110. A point-of-sale (POS) system (not shown) of merchant system 110 can communicate a request message (e.g., an authorization request message) to payment gateway 130, which may, in turn, communicate with one or more of payment processors 150A-150C. The POS system may be any system that facilitates receipt of a payment vehicle or enables card-not-present (CNP) workflows for payment of a purchase such as, for example, a POS terminal at a brick-and-mortar store, a web interface hosted by an electronic commerce (e-commerce) server, an application interface, etc. The request message may include various information, such as a merchant category code (MCC), a merchant identifier (MID), requested amount of funds to be authorized, payment vehicle information, cardholder identification information, and so forth. Payment processor 150A, 150B, or 150C that receives the request message may route the message through the appropriate payment network 160 to issuer system 170A, 170B, or 170C. Example payment network 160 may comprise the VISA, MASTERCARD, and AMERICAN EXPRESS payment network. Issuer system 170A, 170B, or 170C that receives the request message may determine whether to authorize the funds. A response to the request message (i.e., a response message) may then be provided through return communications to merchant system 110. Based on the response message, the transaction initiated by the consumer may be either approved or denied. It should be noted that, although only merchant system 110 is shown in FIG. 1, a plurality of merchant systems may be in communication with payment gateway 130 to process transactions initiated at their respective systems.

In general, the response message may comprise all or a portion of the information contained in the corresponding request message (e.g., MCC, MID, requested amount of funds to be authorized, payment vehicle information, cardholder identification information, etc.). The response message may further include an identifier representative of the payment processor that generated, or is associated with the response message. In one embodiment, the request message and the corresponding response message may each comprise an identifier that uniquely identifies the pair of messages. The unique identifier may be generated by merchant system 110 when the request message is created, and may be included/appended in the request message. In some embodiments, the unique identifier may be generated further downstream, for example, by DRS system 220 which will be described below in reference to FIG. 2. The unique identifier may also be included in a response message corresponding to the request message. Therefore, in one embodiment, the unique identifier may be included in the response message by a payment processor that receives/processes the request message. In some embodiments, the unique identifier may be included in a response message by payment gateway 130, in case a connection with a payment processor cannot be established and the response message is instead generated by payment gateway 130, which will be explained in greater detail in reference to FIG. 11. The unique identifier may be used to keep track of the request and response messages within payment system 100 (and payment system 200 discussed below).

As explained above, when the consumer initiates a transaction at merchant system 110, the POS system (not shown) may be configured to transmit the request message to payment gateway 130. The payment gateway 130 may accept request messages from a variety of merchants and route the request messages to appropriate payment processors, such as one of payment processors 150A-150C. Payment gateway 130 may determine the destination payment processor based on the request message. For instance, a request message generated by a merchant system may comprise an indicator or identifier that is representative of a payment processor to which payment gateway 130 may route the request message. In one embodiment, the request message may be an application programming interface (API) call.

Transaction records may be stored in one or more locations within the system 100. In one embodiment, the transaction records may be stored within a transaction data databases of payment processors 150A-150C. The transaction data forming the transaction records may be received by the transaction data databases from various sources, such as merchant system 110, issuer systems 170A-170C, and so on. A plurality of transaction parameters associated with a purchase transaction may be stored in each transaction record which can generally be used for settlement and financial recordkeeping. While the transaction parameters stored in each transaction record can vary, example transaction parameters may include, without limitation, an account number, a card number, payment vehicle information, product information (such as product type, product serial number, and so forth), a transaction amount, loyalty account information, merchant information, a transaction amount, a response code, a transaction date, a transaction time, whether the transaction was a "card present" transaction, and so on.

Figure 2:
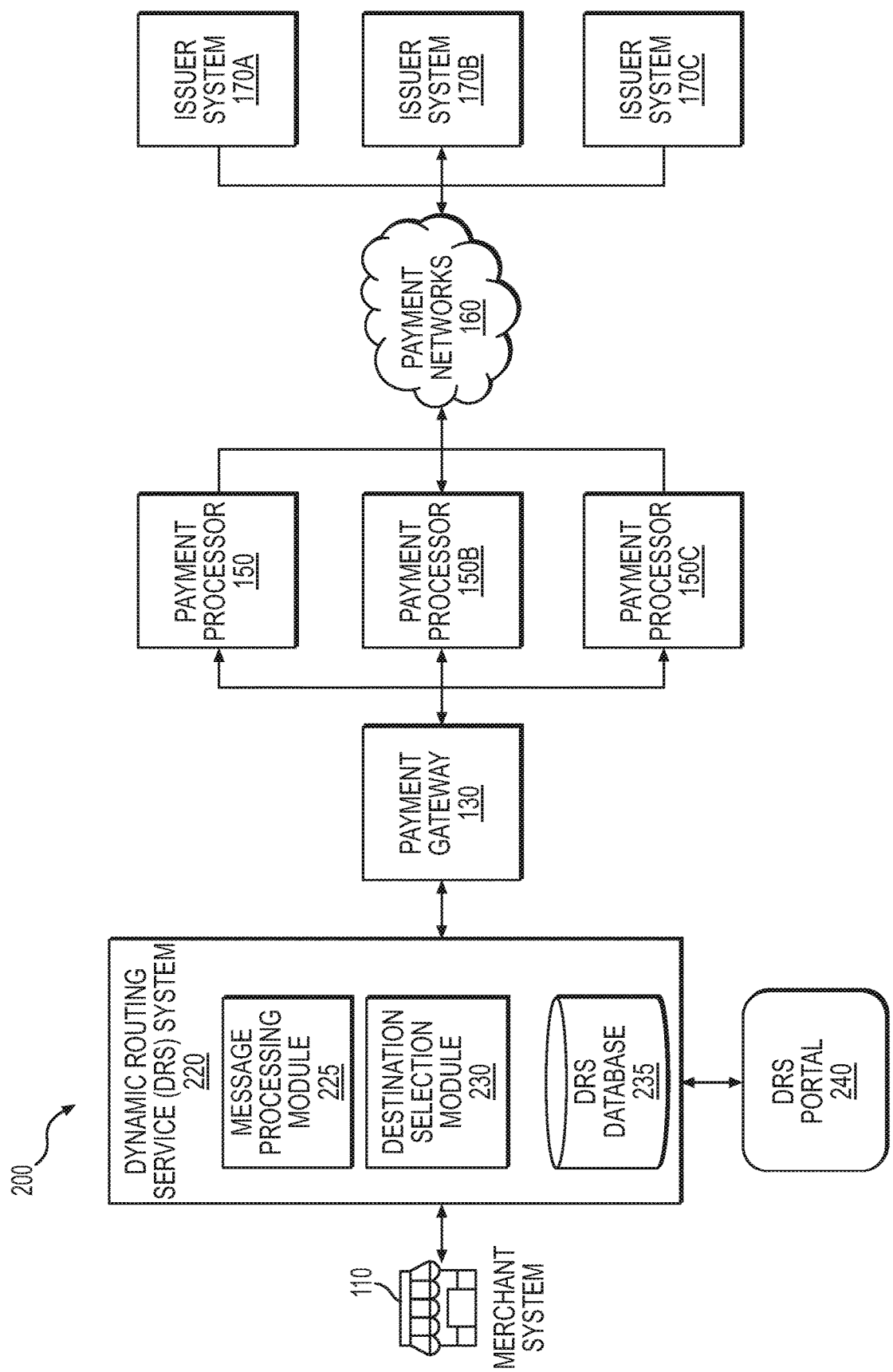
FIG. 2 depicts a block diagram of another exemplary payment system employing a dynamic routing service (DRS) system, according to one aspect of the present disclosure.

FIG. 2 depicts a block diagram of another exemplary payment system, according to one aspect of the present disclosure. Payment system 200 largely comprises the entities discussed above in reference to payment system 100 depicted in FIG. 1. However, in contrast to payment system 100, payment system 200 may include dynamic routing service (DRS) system 220 that improves processing speed and efficiency of electronic transactions via message routing. DRS system 220 may be situated between merchant system 110 and payment gateway 130. DRS system 220 may thus receive a request message that would have otherwise been directed to payment gateway 130, determine a payment processor to which the request message needs to be routed in accordance with a predefined routing directive, and update the request message (e.g., payload of the request message) to indicate the determined payment processor.

A request message generated by merchant system 110 may initially specify a payment processor to which the message is directed. Such a payment processor may be referred to as an initial destination payment processor. Once the request message is received at DRS system 220, in accordance with a routing directive, DRS system 220 may update the request message to specify a payment processor that is different from the initial destination processor. The payment processor that is specified in the updated request message via the routing step performed by DRS system 220 may be referred to as a final destination payment processor. In some embodiments, the final destination payment processor may be different from the initial destination payment processor. In other embodiments, the final destination payment processor may be the same as the initial destination payment processor. Updating the request message may comprise altering a message payload of the request message to designate the final destination payment processor as the message destination (i.e., update from the initial destination payment processor to the final destination payment processor).

DRS system 220 may comprise message processing module 225, destination selection module 230, and DRS database 235. Message processing module 225 may be configured to parse received messages (e.g., request message, response message, etc.) and determine message destinations as well as message origination points (e.g., a payment processor, a merchant system, etc.). Message processing module 225 may also be configured to parse received messages and determine status codes. A status code may comprise alphabetical, numerical, or alphanumerical characters and may represent a condition of an entity or a connection within the payment system 200, which will be described further in reference to FIGS. 4-5. Message processing module 225 may also be configured to determine a time of transmission of a message transmitted from the DRS system 220 to another entity, and a time of receipt of a message received by the DRS system 220 from another entity. Message processing module 225 may store all or a portion of the above data in DRS database 235. The data stored in the DRS database 235 may be used by destination selection module 230 to make a routing decision. Message processing module 225 may also send a portion of the above data directly to destination selection module 230 for further processing.

Destination selection module 230 may be configured to determine, based on data stored in DRS database 235 and/or data received from message processing module 225, a payment processor to which a received request message may be routed. In other words, destination selection module 230 may be configured to determine a final destination payment processor. Notably, destination selection module 230 may determine the final destination payment processor based on a routing directive associated with the request message. Destination selection module 230 may find the routing directive based on certain data included in the request message such as, for example, merchant identifier (MID), merchant category code (MCC), requested amount of funds to be authorized, payment vehicle information, etc. In some embodiments, destination selection module 230 may use a status code, which may be included in a response message, to find the routing directive associated with a corresponding request message. If a routing directive associated with a request message is found, the request message is updated in accordance with the routing directive (e.g., indicating a final destination payment processor), prior to being transmitted to payment gateway 130. However, if a routing directive is not found, the request message may be transmitted to payment gateway 130 without being updated (e.g., indicating an initial destination payment processor). In some embodiments, a system-wide routing directive may be in place, meaning all request messages may be routed by DRS system 220 in accordance with the system-wide routing directive.

Figure 3:
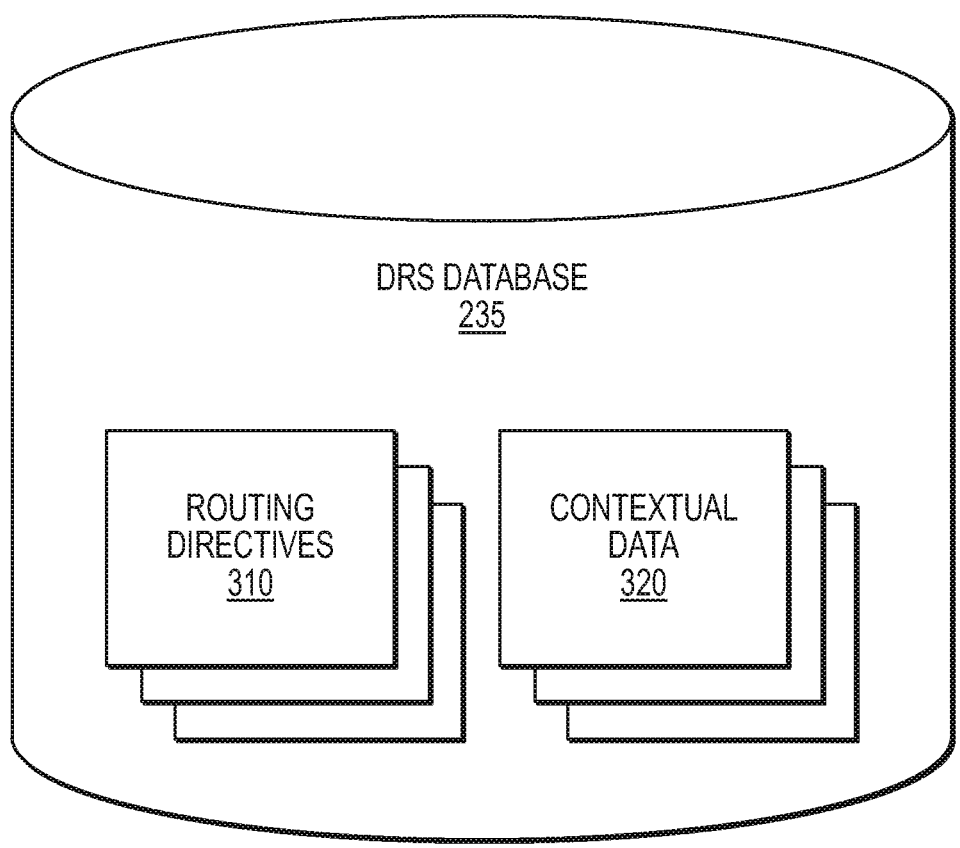
FIG. 3 shows a block diagram illustrating the types of data stored in a database of a DRS system, according to one aspect of the present disclosure.

As explained above, DRS database 235 may store various data collected by message processing module 225. Additionally, DRS database 235 may store routing directives. FIG. 3 shows a block diagram illustrating the types of data stored in DRS database 235. The following discussion may refer to both FIG. 3 and FIG. 2. In general, DRS database 235 may store routing directives 310 and contextual data 320. Routing directives 310 may be provided by a user (e.g., a merchant, an administrator of DRS system 220, or any operator of DRS system 220) via DRS portal 240. DRS portal 240 may provide an interface and a plurality of graphical user interface (GUI) elements to enable a user to input routing configuration settings for request messages and specify characteristics of request messages to which routing directives may be applicable. As one example, a user may compose routing directives 310 for request messages originating from merchant system 110, utilizing the DRS portal 240. As explained above, in some embodiments, a user may be able to set a routing configuration setting for all request messages received at DRS system 220 (i.e., system-wide routing directive). In one embodiment, DRS portal 240 may be a web-based portal, so that the user may log in and create, modify, and/or remove one or more routing directives 310. In some embodiments, the user may specify a list of payment processors to which request messages from a merchant system may be routed (i.e., candidate destination payment processors), via DRS portal 240. Thus, a list of candidate destination payment processors specified for each merchant system may be stored in DRS database 235. The list of candidate destination payment processors may comprise all or a portion of payment processors in payment system 200. When determining a final destination payment processor for a request message, DRS system 220 may consider contextual data 320 associated with candidate destination payment processors and/or connections thereto, in conjunction with an appropriate routing directive.

As explained above, contextual data 320 may comprise data collected by message processing module 225. In general, contextual data 320 may comprise any data that may describe conditions of components and connections thereto within payment system 200. Non-limiting examples of contextual data 320 may include request message origination points (e.g., merchant systems) and request message destinations (e.g., payment processors), times of transmission of request messages to payment gateway 130, response message origination points (e.g., payment processors and/or issuer systems) and response message destinations (e.g., merchant systems), times of receipt of response messages, status codes associated with payment processors and/or connections thereto, times associated with status codes, historical and current cost/fees associated with each payment processor, etc. In one embodiment, destination selection module 230 may determine a final destination payment processor for a request message based on contextual data associated with candidate destination payment processors. Contextual data 320 may also include parameters and corresponding values calculated based on the data mentioned above, such as response times of payment processors, average response times, error rates (e.g., number of errors per minute, hour, etc.) of processors and connections thereto, average error rates, etc.

FIG. 4 depicts exemplary routing directives that may be configured via DRS portal 240. However, routing directives that can be generated and processed by DRS system 220 are not limited to the routing directives specifically discussed in this section. DRS portal 240 may be configured to present a variety of routing parameters and/or values that the user may choose from during the process of configuring a routing directive. In one embodiment, such routing parameters may comprise one or more of a message type 410, a routing directive type 420, an error type (i.e., status code) 430, and destination selection criteria 440. In configuring a routing directive, the user may choose one or more routing parameters and their corresponding values in order to route a request message under a specific condition. It should be noted that the example routing directives as well as various parameter and values associated with such routing directives discussed herein are non-limiting. A routing directive may be configured in a dynamic manner, using a distinct combination of parameters and/or values discussed throughout the present disclosure.

Message type 410 may specify the type(s) of request messages to which the instant routing directive may be applicable. For instance, as shown in table 450, a message type 410 may specify that the routing directive may be applicable to request messages originating from a merchant system associated with a particular merchant identifier (MID). Another message type 410 may specify that the routing directive may be applicable to request messages originating from one or more merchant systems associated with a particular merchant category code (MCC). Further, a message type 410 may specify that the routing directive may be applicable to all request messages received at DRS system 220 (i.e., a system-wide routing directive). In some embodiments, routing directives may be assigned respective priority values/identifiers to indicate a preferred directive when more than one directive is applicable to a given request.

Routing directive type 420 may specify whether application of the routing directive may be error-based or not. An error-based routing directive may be applicable to a request message once the request message has been transmitted to an initial destination payment processor (by way of payment gateway 130) and an error message has been received in response. In other words, an error-based routing directive may be applicable if it is determined that the initial destination payment processor is currently unresponsive or unable to process the request message. On the other hand, a non-error-based routing directive may be applicable to a request message regardless of whether the initial destination payment processor is currently responsive or able to process the request message. In one embodiment, a non-error-based routing directive may be applied to a request message when the request message is received at DRS system 220, prior to transmission of the request message downstream and without having to determine the current status of the initial destination payment processor. Therefore, by using a non-error-based routing directive, a routing decision regarding certain request messages may be made promptly once those messages have been received at DRS system 220.

Error type or status code 430 may also be specified in the case of error-based routing directives. One or more status codes 430 may be specified for an error-based routing directive to limit application of the routing directive to instances of specific error type(s). As explained above, an error-based routing directive is applied to a request message once the request message has been transmitted to an initial destination payment processor and an error message has been returned. If the error-based routing directive includes one or more status codes, the routing directive may be applied to the request message only if the response message contains at least one of the one or more status codes. In table 450, status codes starting with the number 3 may indicate a connectivity error, and status codes starting with the number 4 may indicate a processor error. A connectivity error may comprise a failure to connect, a timeout, etc. A processor error may comprise an "unable to process" error (i.e., payment processor is unable to process the request message), a "service unavailable" error (i.e., a service associated with processing of the request message is unavailable at the payment processor), a "no answer" error (i.e., payment processor is unresponsive), etc. The numerical sequences representing various status codes in table 450 are exemplary only, and a status code may contain any numeric, alphabetical, or alphanumeric character sequence representative of an error type.

Destination selection criteria 440 may specify desired characteristics or status of a final destination payment processor to which the request message may be routed. Destination selection criteria 440 may also specify a time window for which the specified characteristics of the final destination payment processor may be analyzed. For example, destination selection criteria may specify that one or more error rates be less than a certain value and/or a response time (e.g., an average response time) be less than a certain value, within a specified time period. Destination selection criteria may also specify a transaction approval rate (e.g., authorized versus declined). Based on the destination selection criteria, a final destination payment processor may be selected from candidate payment processors. The characteristics specified in the destination selection criteria 440 may be determined based on contextual data stored in DRS database 235.

In some embodiments, destination selection criteria may instruct a split routing among multiple payment processors, based on the characteristics of the candidate payment processors within a time window. For example, destination selection criteria may contain instructions to allocate and route varying amounts (i.e., percentages) of request messages to candidate payment processors that meet certain characteristics (e.g., error rates, response time, etc.). As another example, destination selection criteria may contain instructions to split routing among multiple candidate payment processors over time, based on peak timeframes determined for each of those payment processors. For instance, if contextual data show that a payment processor A receives a highest amount of messages or may be "busiest" around noon, and a payment processor B is less busy around the same time, DRS system 220 may route all messages (or a certain percentage of messages) around noon to payment processor B instead of payment processor A. Then, if payment processor B is experiencing a high volume of messages at another time and payment processor A is less busy, DRS system 220 may route all messages (or a certain percentage of messages) around that time to payment processor A instead of payment processor B. The split routing based on peak timeframes may also be percentage-based.

In addition to routing around peaks and valleys at candidate payment processors, split routing instructions may be based on anticipated transaction volumes of a merchant system. For example, if a merchant system is planning a limited promotion (e.g., a flash sale) and expects an usual amount of traffic during a specific time period, a routing directive that shifts routing into a split mode between multiple candidate payment processors may be applied during that time period. Further, more than one directive may be evaluated in making the routing decisions. For example, a split-routing directive may be fully or partially overridden if one or more of the candidate payment processors are exhibiting poor status/conditions. The evaluations may be facilitated by assigning priority identifiers/values to applicable routing directives, as discussed above.

Using split routing, the flow of request messages to payment processors may dynamically change depending on the status/conditions of the payment processors and connections thereto, reducing network bottlenecks and message processing time in payment system 200. Again, it should be noted that the examples discussed in this section are non-limiting. A split routing instruction may be configured in various ways, using the various parameters, characteristics, and/or conditions associated with payment processors discussed throughout the present disclosure.

In some embodiments, determining the final destination payment processor and/or the split routing schedule may comprise using a trained machine learning model. A machine learning model may be trained using contextual data stored in DRS database 235, and the final destination payment processor and/or the split routing schedule may be determined using the machine learning model. Any suitable machine learning technique that is now known or later developed may be used. In some embodiments, a final destination payment processor may be determined based on costs associated with candidate destination payment processors. The destination selection criteria may instruct that a payment processor associated with a least amount of cost be selected as the final destination payment processor. Alternatively, the destination selection criteria may instruct that payment processors associated with costs less than a certain amount be selected to perform split routing.

FIG. 5 depicts exemplary contextual data that may be stored in DRS database 235. Table 550 may store a status location 520 (e.g., connectivity, processor, etc.), a status code 530, a status time 540, etc. associated with a corresponding payment processor 510. The status location 520, status code 530, and the status time 540 may be identified from a response message received from a payment processor via payment gateway 130. In other words, a response message received in response to a request message may include various parameters and values that describe the condition or status of the corresponding payment processor. Those parameters and values may be stored in DRS database 235 as contextual data, for example, as depicted in FIG. 5. Status location 520 may indicate the location of the condition/status reported via the response message such as, for example, processor or connectivity status. Status code 530 may be numeric, alphabetical, or alphanumeric character sequence representative of a condition or status reported via the response message. Status or conditions represented by status codes may include a failure to connect, timeout, unable to process, unavailable service, unresponsive processor, unstable connection, message processed successfully, connection success, etc. Status time 540 may represent the time that the condition/status was detected, identified, or logged.

FIG. 6 depicts another exemplary contextual data that may be stored in DRS database 236. Particularly, FIG. 6 illustrates how a response times (i.e., payment processor response time) may be determined from contextual data. For each request message directed to a payment processor 610, a time of transmission of the request message (i.e., request time 620) and a time of receipt of a response message corresponding to the request message (i.e., response time 630) may be recorded by DRS system 220. Based on these information, payment processor response times (i.e., response times) may be determined based on a time difference between the request time 620 and the response time 630. In some embodiments, peak timeframes of the payment processors may be also determined based on, for example, the number of request times and/or response times recorded for each of the payment processors in payment system 200. Alternatively, a peak timeframe of a payment processor may be determined based on identifying time periods during which the response times are longer than a threshold value (i.e., it may take longer for the payment processor to process and respond to request messages due to a high volume of messages being routed to the payment processor during the identified time period).

Figure 7:
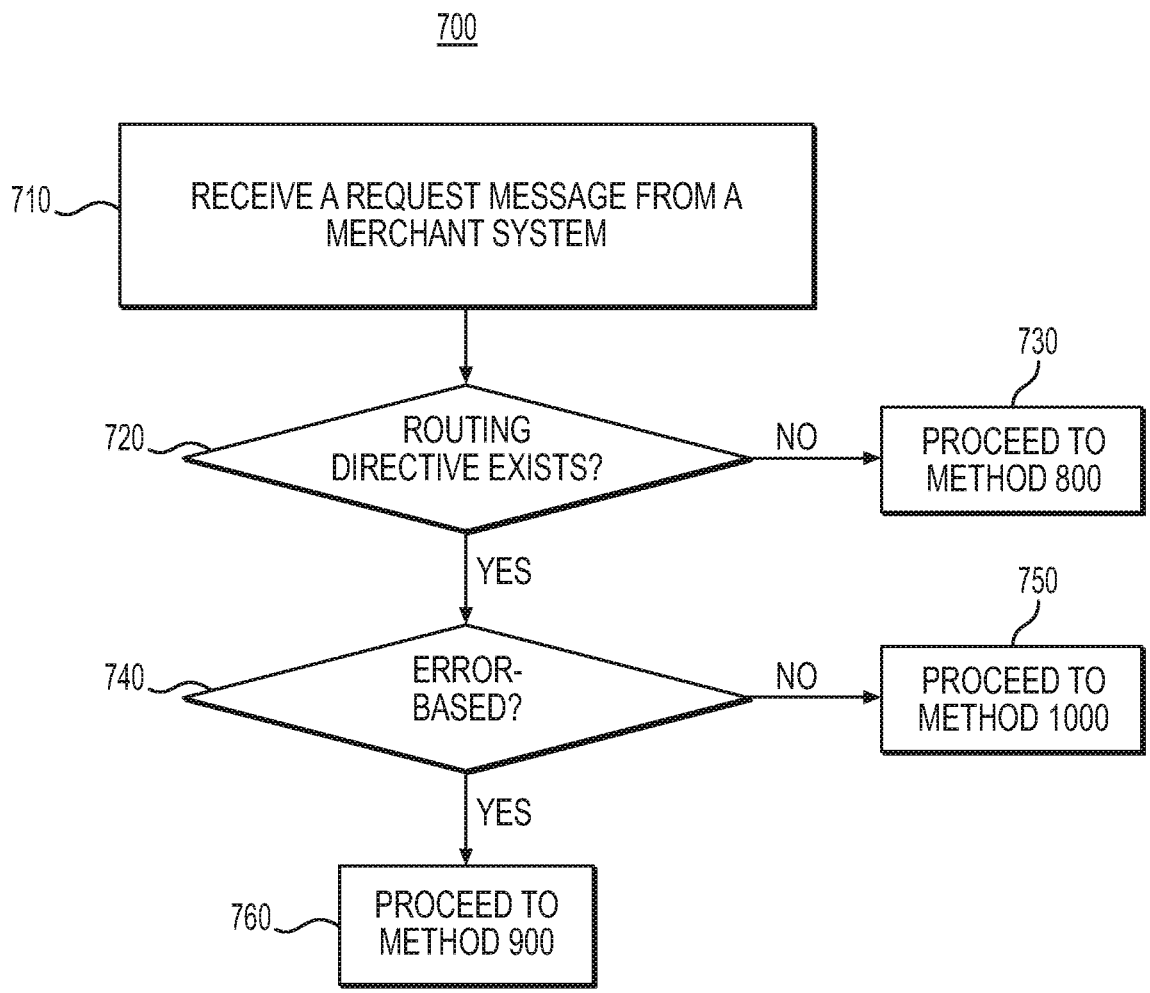
FIG. 7 depicts a flowchart of an exemplary method of receiving and categorizing a request message, according to one aspect of the present disclosure.

FIG. 7 depicts a flowchart of an exemplary method of receiving and categorizing a request message, according to one aspect of the present disclosure. In particular, method 700 may be performed by DRS system 220 (e.g., message processing module 225 thereof). As explained above, a request message may be associated with a routing directive, which may decide a final destination payment processor to which the request message may be directed. The application of the routing directive may be error-based or non-error-based. In other words, an error-based routing directive may be applied to a corresponding request message if the initial destination payment processor returns an error message (i.e., a status code indicating an error), and a non-error-based routing directive may be applied to a corresponding request message regardless of whether the initial destination payment processor is working or connected properly. Further, a request message may not be associated with any routing directive. In those circumstances, the request message may not be updated and may be routed to a corresponding initial destination payment processor. Method 700 may categorize a request message based on whether a routing directive exists, and if a routing directive exists, whether the routing directive is error-based or non-error-based.

At step 710, DRS system 220 may receive a request message from a merchant system. As explained above, the received request message may comprise transaction data, and may also include an identifier associated with an initial destination payment processor. At step 720, DRS system 220 may determine whether a routing directive associated with the request message exists in DRS database 235. As explained above, a routing directive associated with the request message may be found using one or more data included in the request message. If DRS system 220 determines that the routing directive does not exist, at step 730, method 700 may proceed to method 800 of FIG. 8. If DRS system 220 determines that the routing directive exists, at step 740, DRS system 220 may determine whether the routing directive is error-based or non-error-based. If DRS system 220 determines that the routing directive is non-error-based, at step 750, method 700 may proceed to method 1000 of FIG. 10. On the other hand, if DRS system 220 determines that the routing directive is error-based, at step 760, method 700 may proceed to method 900 of FIG. 9.

Figure 8:
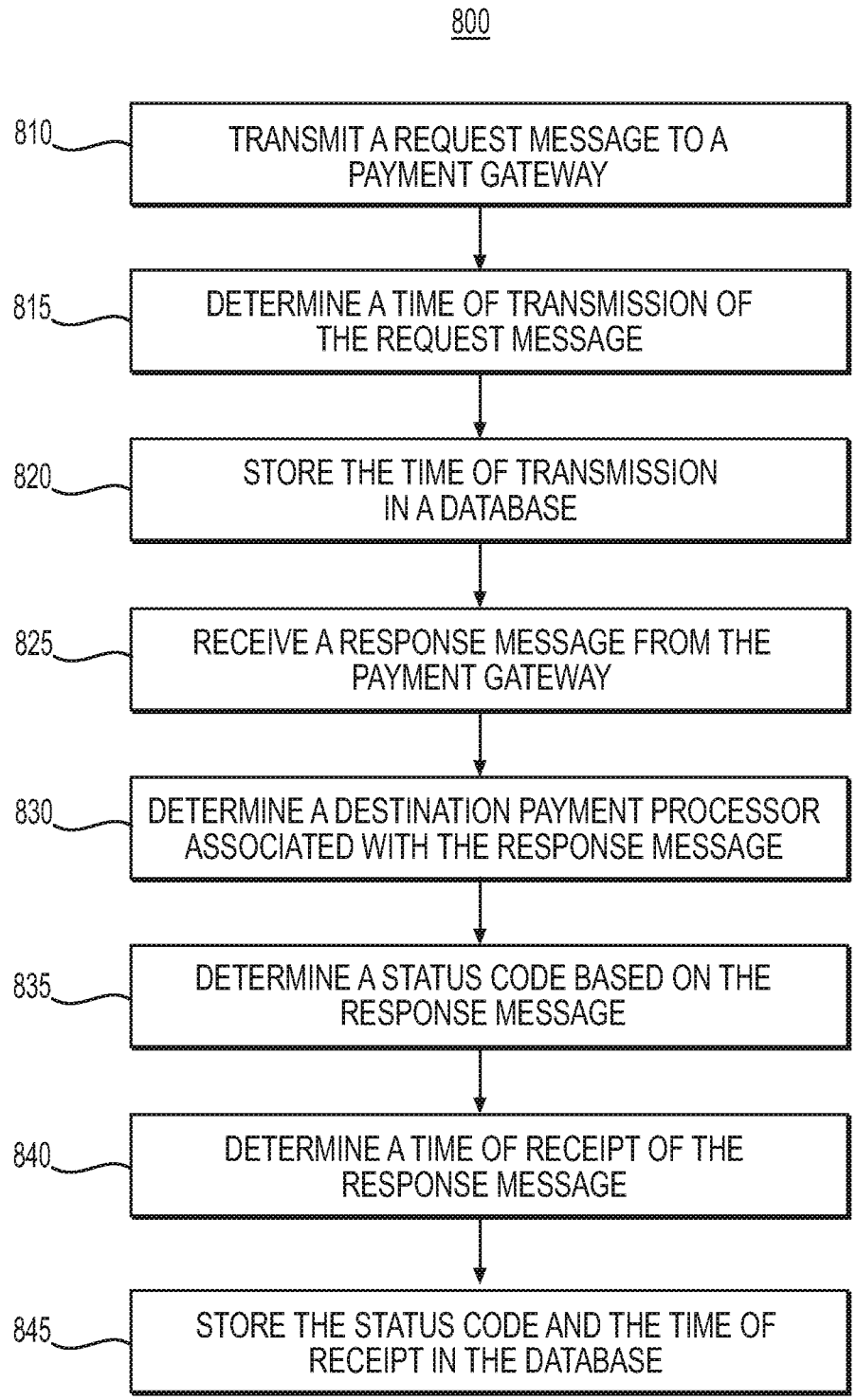
FIG. 8 depicts a flowchart of an exemplary method of routing a request message, according to one aspect of the present disclosure.

FIG. 8 depicts a flowchart of an exemplary method of routing a request message, according to one aspect of the present disclosure. Notably, method 800 may be performed by DRS system 220 (e.g., message processing module 225 and destination selection module 230 thereof) to route a request message that is not associated with any routing directive. Because the request message is not associated with any routing directive, the request message may be routed to an initial destination payment processor specified in the received request message. However, because DRS system 220 may retain and continue to collect status/performance data associated with payment processors 150A-150C and connections thereto within payment system 200, DRS system 220 may still record data related to the status and/or performance of the payment processors 150A-150C, such as a time of transmission of the request message downstream (i.e., to payment processors 150A-150C via payment gateway 130), a time of receipt of a response message, a status code in the response message, etc.

At step 810, DRS system 220 may transmit the request message to a payment gateway (e.g., payment gateway 130), without altering or updating the identifier associated with an initial destination payment processor included in the request message. At step 815, DRS system 220 (e.g., message processing module 225 thereof) may determine a time of transmission of the request message. At step 820, DRS system 220 (e.g., message processing module 225 thereof) may store the time of transmission in DRS database 235. At step 825, DRS system 220 (e.g., message processing module 225 thereof) may receive a response message from the payment gateway. At step 830, DRS system 220 (e.g., message processing module 225 thereof) may parse the response message and determine a destination payment processor associated with the response message. In other words, DRS system 220 may determine the payment processor from which the response message is received, or with which the response message is associated. At step 835, DRS system 220 (e.g., message processing module 225 thereof) may determine a status code based on the response message. In other words, DRS system 220 may retrieve the status code included in the response message. At step 840, DRS system 220 (e.g., message processing module 225 thereof) may determine a time of receipt of the response message. In some embodiments, DRS system 220 may also determine a time associated with the status code. For instance, if the status code is associated with an error, the time associated with the status code may represent the time that the error was detected in the destination payment processor or in the connection thereto. At step 845, the DRS system 220 (e.g., message processing module 225 thereof) may store the status code and the time of receipt (and the time associated with the status code) in DRS database 235. When evaluating contextual data to identify a final destination payment processor, DRS system 220 may consider the status codes along with the times of receipt. For example, DRS system 220 may consider these data to prevent routing to a very fast but also very error-prone payment processor.

Figure 9:
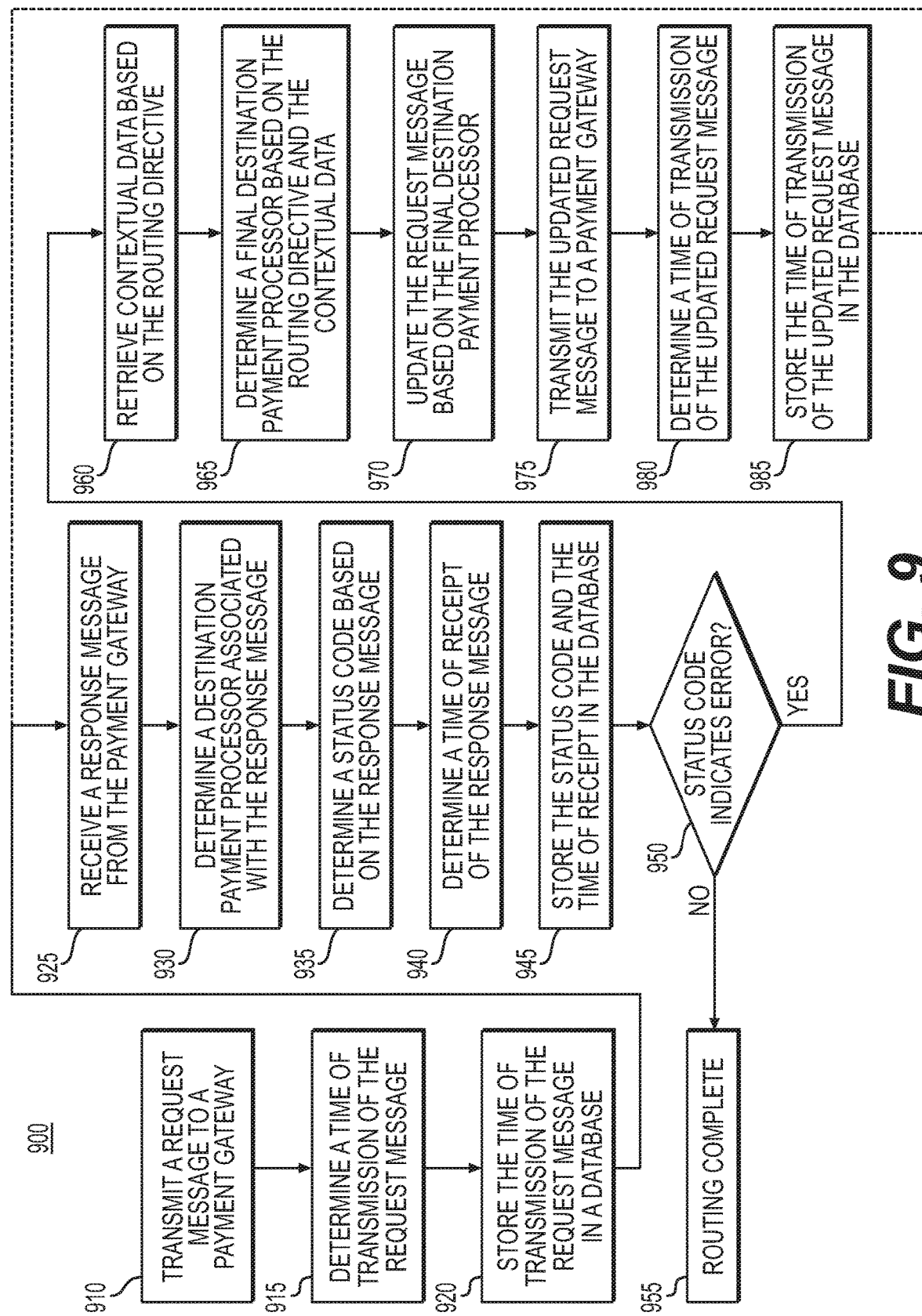
FIG. 9 depicts a flowchart of another exemplary method of routing a request message, according to one aspect of the present disclosure.

FIG. 9 depicts a flowchart of another exemplary method of routing a request message, according to one aspect of the present disclosure. Notably, method 900 may be performed by DRS system 220 (e.g., message processing module 225 and destination selection modules 230 thereof) to route a request message that is associated with an error-based routing directive. Because the request message is associated with an error-based routing directive, DRS system 220 may first determine whether the initial destination payment processor can be reached and/or can process the request message properly. Therefore, DRS system 220 may transmit (or attempt to transmit) the request message to the initial destination payment processor first, and may decide whether to re-route the request message to a final destination payment processor based on a response message received in association with the initial destination payment processor. If the response message received in association with the initial destination payment processor indicates an error (e.g., a connective error, a processor error, etc.), DRS system 220 may re-route the request message to a final destination payment processor determined based on the routing directive and relevant contextual data.

At step 910, DRS system 220 may transmit the request message to a payment gateway (e.g., payment gateway 130), without altering or updating the identifier associated with an initial destination payment processor included in the request message. At step 915, DRS system 220 (e.g., message processing module 225 thereof) may determine a time of transmission of the request message. At step 920, DRS system 220 (e.g., message processing module 225 thereof) may store the time of transmission in DRS database 235. At step 925, DRS system 220 (e.g., message processing module 225 thereof) may receive a response message from the payment gateway. At step 930, DRS system 220 (e.g., message processing module 225 thereof) may parse the response message and determine a destination payment processor associated with the response message. In other words, DRS system 220 may determine the payment processor from which the response message is received, or with which the response message is associated. At step 935, DRS system 220 (e.g., message processing module 225 thereof) may determine a status code based on the response message. In other words, DRS system 220 may retrieve the status code included in the response message. In some embodiments, DRS database 235 may retain a response mapping table. A response mapping table may map each status code to a corresponding normalized definition, such that status codes that indicate the same condition/status or are classified in the same category may be interpreted and treated uniformly. At step 940, DRS system 220 (e.g., message processing module 225 thereof) may determine a time of receipt of the response message. In some embodiments, DRS system 220 may also determine a time associated with the status code. For instance, if the status code is associated with an error, the time associated with the status code may represent the time that the error was detected in the destination payment processor or in the connection thereto. At step 945, the DRS system 220 (e.g., message processing module 225 thereof) may store the status code and the time of receipt (and the time associated with the status code) in DRS database 235.

At step 950, DRS system 220 (e.g., message processing module 225 thereof) may determine whether the status code indicates an error. If DRS system 220 determines that the status code does not indicate an error, method 900 may proceed to step 955 where the routing step is completed. In other words, because the routing directive is error-based and the initial destination payment processor did not return an error message (i.e., the initial destination payment processor was able to process the request message properly), the routing process associated with the request message is aborted without re-routing the request message to a final destination payment processor. On the other hand, if DRS system 220 determines that the status code indicates an error, method 900 may proceed to step 960 to initiate a re-routing procedure.

At step 960, DRS system 220 (e.g., destination selection module 230 thereof) may retrieve contextual data based on the routing directive. As explained above in reference to FIG. 4, a routing directive may comprise destination selection criteria specifying what types of contextual data need to be analyzed to decide a final destination payment processor. Thus, DRS system 220 may retrieve contextual data from DRS database 235 based on the destination selection criteria specified in the routing directive. At step 965, DRS system 220 (e.g., destination selection module 230 thereof) may determine a final destination payment processor based on the routing directive and the retrieved contextual data. As explained above, a final destination payment processor that satisfies the destination selection criteria may be selected. At step 970, DRS system 220 (e.g., message processing module 225 or destination selection module 230 thereof) may update the request message based on the final destination payment processor. In other words, DRS system 220 may update the identifier associated with the initial destination payment processor to an identifier associated with the final destination payment processor. At step 975, DRS system 220 (e.g., message processing module 225 thereof) may transmit the updated request message to the payment gateway. At step 980, DRS system 220 (e.g., message processing module 225 thereof) may determine a time of transmission of the updated request message. At step 985, DRS system 220 (e.g., message processing module 225 thereof) may store the time of transmission of the updated request message in DRS database 235.

Upon transmitting the updated request message and storing the time of transmission, DRS system 220 may further receive a response message from the payment gateway, the response message corresponding to the updated request message. Therefore, as indicated by the dotted line in FIG. 9, method 900 may loop back to step 925 after step 985, in order to determine whether the updated request message has been successfully processed by the final destination payment processor. If the updated request message has been successfully processed, further re-routing may not be necessary and method 900 may thus be aborted. If the updated request message has not been successfully processed (i.e., if the final destination payment processor returns an error message), the request message may be further re-routed after determining another final destination payment processor. More detailed discussion will follow in the sections below.

At step 925, DRS system 220 (e.g., message processing module 225 thereof) may receive a response message from the payment gateway. Notably, the response message may be in response to the updated request message transmitted at step 975. At step 930, DRS system 220 (e.g., message processing module 225 thereof) may determine a destination payment processor associated with the response message (i.e., the final destination payment processor to which the updated request was transmitted at step 975). At step 935, DRS system 220 (e.g., message processing module 225 thereof) may determine a status coded included in the response message. At step 940, DRS system 220 (e.g., message processing module 225 thereof) may determine a time of receipt of the response message. As discussed above, DRS system 220 may also determine a time associated with the status code (i.e., a time at which the condition indicated by the status code was determined). At step 945, DRS system 220 (e.g., message processing module 225 thereof) may store the status code and the time of receipt (and the time associated with the status code) in DRS database 235. At step 950, DRS system 220 (e.g., message processing module 225 thereof) may determine whether the status code indicates an error. If the status code does not indicate an error, method 900 may proceed to step 955 where the routing step is completed. In other words, because the final destination payment processor did not return an error message (i.e., the final destination payment processor was able to process the updated request message properly), the routing process associated with the updated request message may be aborted without re-updating and re-routing the request message to another final destination payment processor. On the other hand, if DRS system 220 determines that the status code indicates an error, method 900 may proceed to step 960 to initiate another re-routing procedure. In FIG. 9, steps 960-985 and then steps 925-950 may be performed iteratively until the request message is processed successfully by a final destination payment processor. In some embodiments however, steps 960-985 may be performed only once and, even if a response message corresponding to an updated request message indicates an error (i.e., a response message from a final destination payment processor indicates an error), re-updating and re-routing of the request message to another final destination payment processor may not be performed. In such a case, the status code indicating the error may be recorded in DRS database 235 (along with the time of receipt of the response message and/or the time of error), and a notification or message may be sent to the merchant, indicating that the request message could not be processed and/or resulted in an error.

Figure 10:
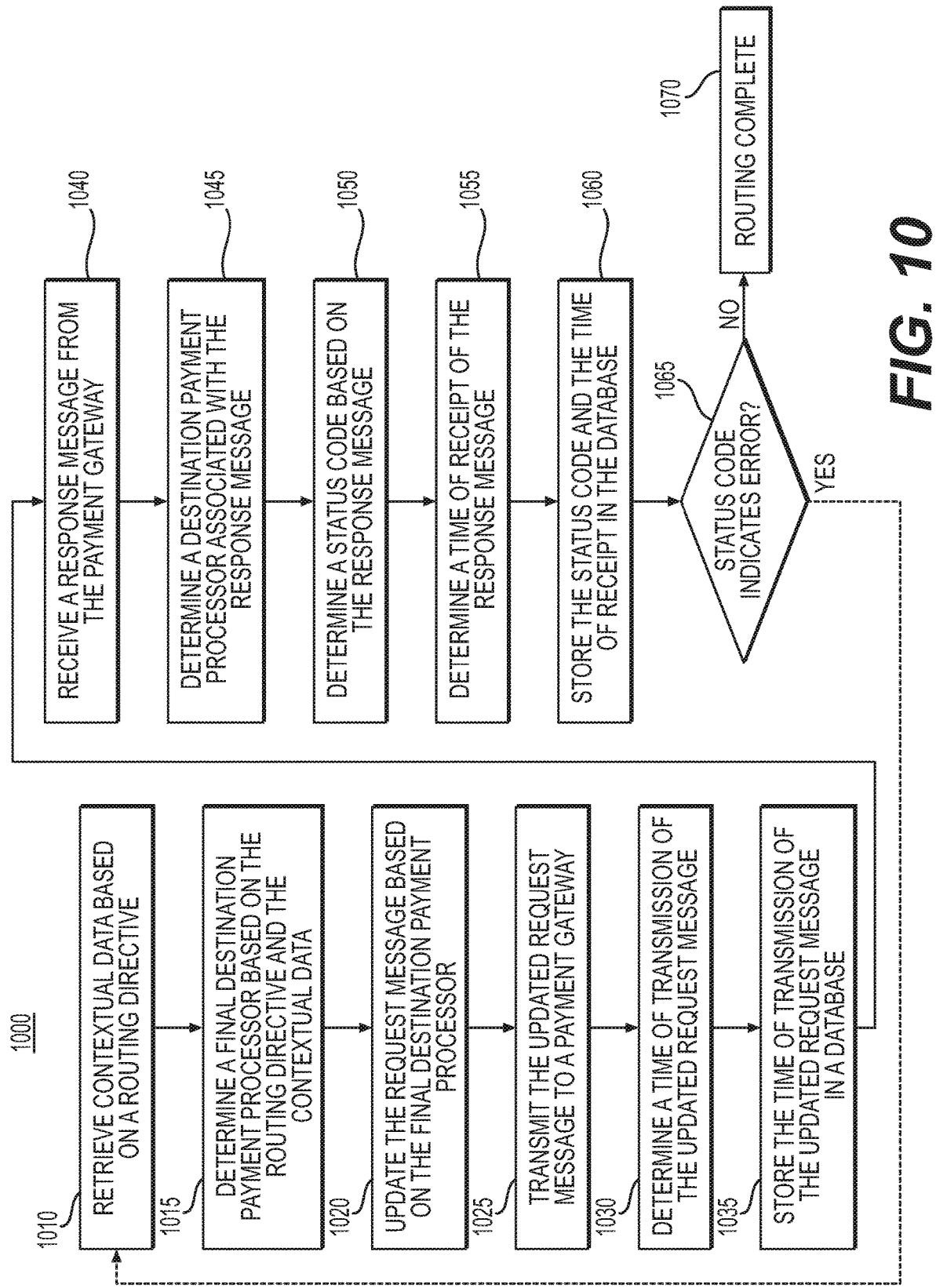
FIG. 10 depicts a flowchart of yet another exemplary method of routing a request message, according to one aspect of the present disclosure.

FIG. 10 depicts a flowchart of yet another exemplary method of routing a request message, according to one aspect of the present disclosure. Notably, method 1000 may be performed by DRS system 220 (e.g., message processing module 225 and destination selection modules 230 thereof) to route a request message that is associated with a non-error-based routing directive. Because the request message is associated with a non-error-based routing directive, DRS system 220 may determine a final destination payment processor in accordance with a determined routing directive without first routing the request message to an initial destination payment processor (i.e., regardless of whether the initial destination payment processor can be reached and can process the request message properly).

At step 1010, DRS system 220 (e.g., destination selection module 230 thereof) may retrieve contextual data based on a routing directive. As explained above in reference to FIG. 4, a routing directive may comprise destination selection criteria specifying what types of contextual data need to be analyzed to decide a final destination payment processor. Thus, DRS system 220 may retrieve contextual data from DRS database 235 based on the destination selection criteria specified in the routing directive. At step 1015, DRS system 220 (e.g., destination selection module 230 thereof) may determine a final destination payment processor based on the routing directive and the retrieved contextual data. As explained above, a final destination payment processor that satisfies the destination selection criteria may be selected. At step 1020, DRS system 220 (e.g., message processing module 225 or destination selection module 230 thereof) may update the request message based on the final destination payment processor. In other words, DRS system 220 may update the identifier associated with the initial destination payment processor to an identifier associated with the final destination payment processor. At step 1025, DRS system 220 (e.g., message processing module 225 thereof) may transmit the updated request message to a payment gateway. At step 1030, DRS system 220 (e.g., message processing module 225 thereof) may determine a time of transmission of the updated request message. At step 1035, DRS system 220 (e.g., message processing module 225 thereof) may store the time of transmission of the updated request message in DRS database 235.

At step 1040, DRS system 220 (e.g., message processing module 225 thereof) may receive a response message from the payment gateway. Notably, the response message may be in response to the updated request message transmitted at step 1035. At step 1045, DRS system 220 (e.g., message processing module 225 thereof) may determine a destination payment processor associated with the response message (i.e., the final destination payment processor to which the updated request was transmitted at step 1025). At step 1050, DRS system 220 (e.g., message processing module 225 thereof) may determine a status coded included in the response message. At step 1055, DRS system 220 (e.g., message processing module 225 thereof) may determine a time of receipt of the response message. As discussed above, DRS system 220 may also determine a time associated with the status code (i.e., a time at which the condition indicated by the status code was determined). At step 1060, DRS system 220 (e.g., message processing module 225 thereof) may store the status code and the time of receipt (and the time associated with the status code) in DRS database 235. At step 1065, DRS system 220 (e.g., message processing module 225 thereof) may determine whether the status code indicates an error. If the status code does not indicate an error, method 1000 may proceed to step 1070 where the routing step is completed. In other words, because the final destination payment processor did not return an error message (i.e., the final destination payment processor was able to process the updated request message properly), the routing process associated with the updated request message may be aborted without re-updating and re-routing the request message to another final destination payment processor. On the other hand, if DRS system 220 determines that the status code indicates an error, method 1000 may loop back to step 1010 to initiate another re-routing procedure. In FIG. 10, steps 1010-1065 may be performed iteratively until the request message is processed successfully by a final destination payment processor. In some embodiments however, steps 1010-1065 may be performed only once and, even if a response message corresponding to an updated request message indicates an error (i.e., a response message from a final destination payment processor indicates an error), re-updating and re-routing of the request message to another final destination payment processor may not be performed. In such a case, a notification or message may be sent to the merchant, indicating that the request message could not be processed and/or resulted in an error.

Figure 11:
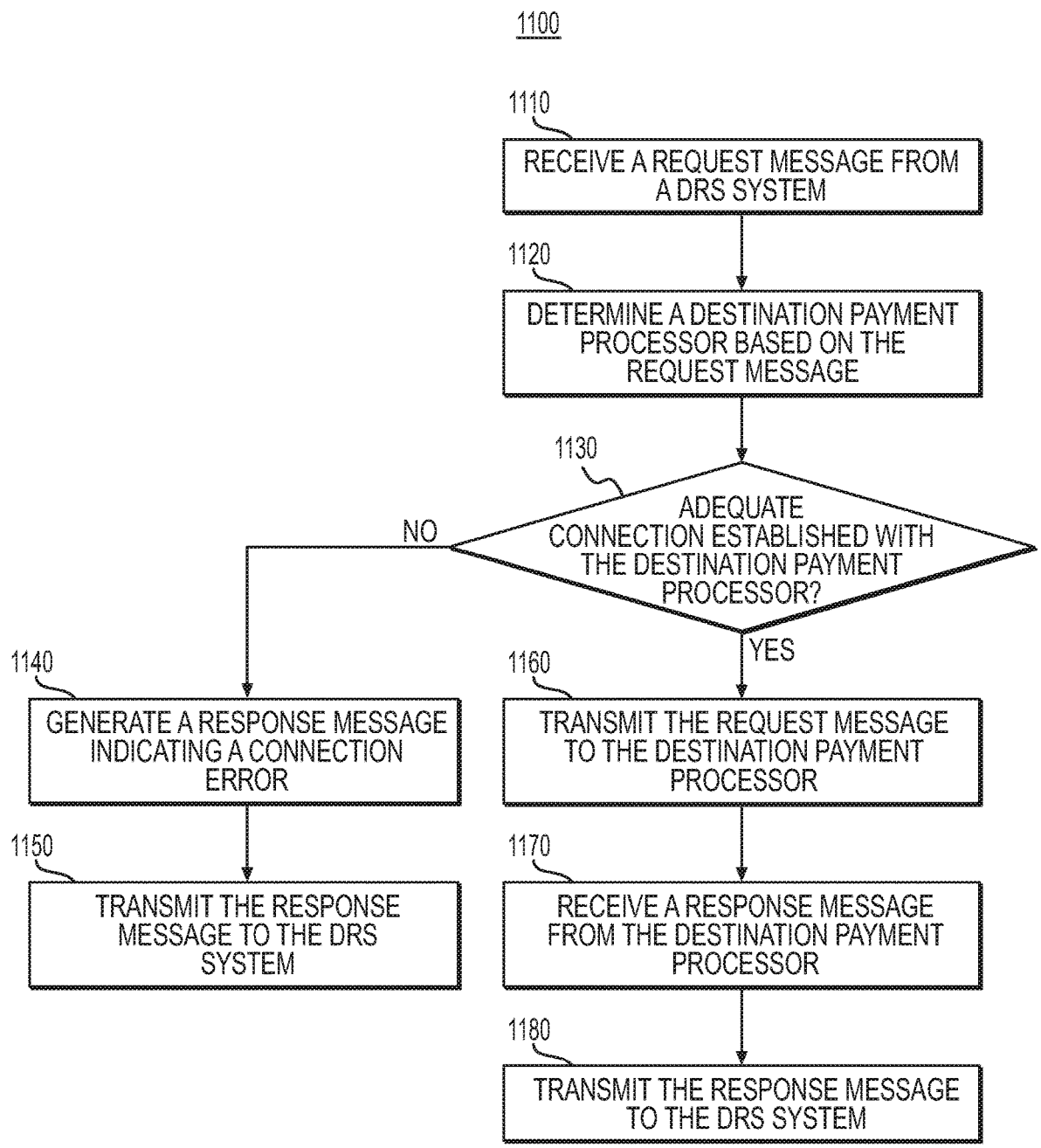
FIG. 11 depicts a flowchart of an exemplary method of routing a request message received from a DRS system at a payment gateway, according to one aspect of the present disclosure.

FIG. 11 depicts a flowchart of an exemplary method of routing a request message received from DRS system 220, according to one aspect of the present disclosure. Notably, method 1100 may be performed by payment gateway 130 to route a request message to an appropriate payment processor indicated in the request message. The request message received from DRS system 220 at payment gateway 130 may indicate i) an initial destination payment processor if the request message was not updated at DRS system 220, or ii) a final destination payment processor if the request message was updated at DRS system 220. As explained above, the final destination payment processor may be the same or different from the initial destination payment processor that was initially indicated in the request message.

At step 1110, payment gateway 130 may receive a request message from DRS system 220. At step 1120, payment gateway 130 may determine a destination payment processor (i.e., initial destination payment processor or final destination payment processor) indicated in the request message. In one embodiment, the destination payment processor may be indicated with an identifier. At step 1130, payment gateway 130 may determine whether an adequate connection can be established with the destination payment processor. In one embodiment, payment gateway 130 may check whether the destination payment processor can be reached via, for example, handshaking or other suitable methodology. In some embodiments, payment gateway 130 may send a test message to the destination payment processor and check whether a test response message is received within a predefined time (i.e., set a timeout). If the test response message is not received within the predefined time, payment gateway 130 may conclude that an adequate connection cannot be established with the destination payment processor.

If it is determined that an adequate connection cannot be established with the destination payment processor at step 1130, method 1100 may proceed to step 1140. At step 1140, payment gateway 130 may generate a response message indicating a connection error (e.g., connection failure, timeout, etc.). To that end, the response message may comprise a status code representative of the connection error. At step 1150, payment gateway 130 may transmit the response message to DRS system 220.

If it is determined that an adequate connection can be established with the destination payment processor at step 1130, method 1100 may proceed to step 1160. At step 1160, payment gateway 130 may transmit the request message to the destination payment processor. At step 1170, payment gateway 130 may receive a response message from the destination payment processor.

In an alternate embodiment, payment gateway 130 may transmit the request message to the destination payment processor (step 1160), without performing step 1130. In other words, payment gateway 130 may not perform step 1130, and may transition from step 1120 to step 1160. In such a case, a connectivity problem may be detected if payment gateway 130 does not receive a response message from the destination payment processor within a predefined time. If a connectivity problem is detected, method 100 may proceed to step 1140. If a connectivity problem is not detected, method 100 may proceed to step 1170.

As explained above, a response message received from a destination payment processor may comprise a status code representative of a status or condition of the destination payment processor (e.g., processing error, processing success, etc.). At 1180, payment gateway 130 may transmit the response message to DRS system 220.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 12:
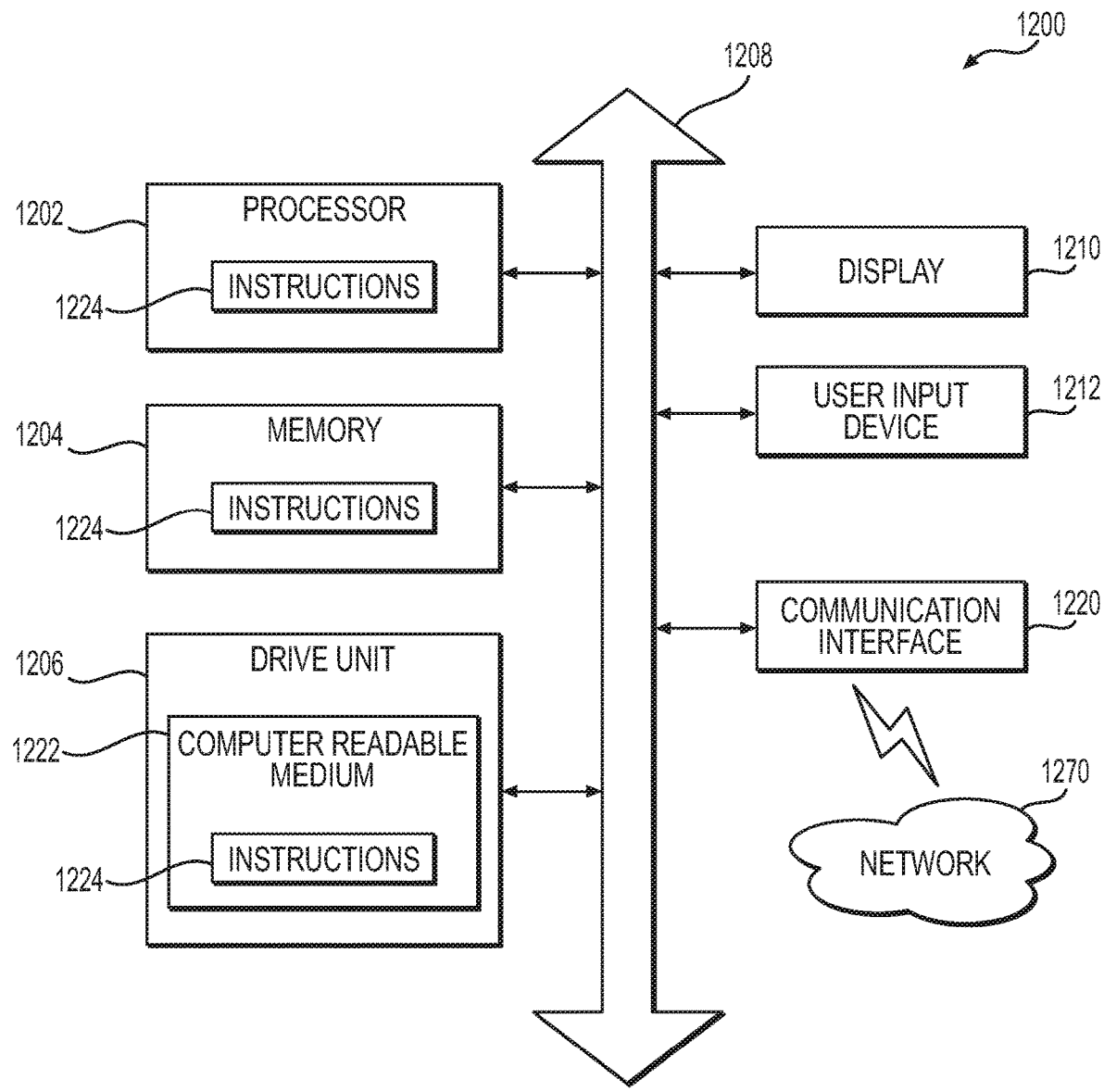
FIG. 12 illustrates an implementation of a computer system that may execute the techniques described herein.

FIG. 12 illustrates an implementation of a computer system designated 1200. The computer system 1200 can include a set of instructions that can be executed to cause the computer system 1200 to perform any one or more of the methods or computer based functions disclosed herein. The computer system 1200 may operate as a standalone device or may be connected, e.g., using a network, to other computer systems or peripheral devices.

In a networked deployment, the computer system 1200 may operate in the capacity of a server or as a client user computer in a server-client user network environment, or as a peer computer system in a peer-to-peer (or distributed) network environment. The computer system 1200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 1200 can be implemented using electronic devices that provide voice, video, or data communication. Further, while a single computer system 1200 is illustrated, the term "system" shall also be taken to include any collection of systems or sub-systems that individually or jointly execute a set, or multiple sets, of instructions to perform one or more computer functions.

As illustrated in FIG. 12, the computer system 1200 may include a processor 1202, e.g., a central processing unit (CPU), a graphics processing unit (GPU), or both. The processor 1202 may be a component in a variety of systems. For example, the processor 1202 may be part of a standard personal computer or a workstation. The processor 1202 may be one or more general processors, digital signal processors, application specific integrated circuits, field programmable gate arrays, servers, networks, digital circuits, analog circuits, combinations thereof, or other now known or later developed devices for analyzing and processing data. The processor 1202 may implement a software program, such as code generated manually (i.e., programmed).

The computer system 1200 may include a memory 1204 that can communicate via a bus 1208. The memory 1204 may be a main memory, a static memory, or a dynamic memory. The memory 1204 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 1204 includes a cache or random-access memory for the processor 1202. In alternative implementations, the memory 1204 is separate from the processor 1202, such as a cache memory of a processor, the system memory, or other memory. The memory 1204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1204 is operable to store instructions executable by the processor 1202. The functions, acts or tasks illustrated in the figures or described herein may be performed by the programmed processor 1202 executing the instructions stored in the memory 1204. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1200 may further include a display unit 1210, such as a liquid crystal display (LCD), an organic light emitting diode (OLED), a flat panel display, a solid-state display, a cathode ray tube (CRT), a projector, a printer or other now known or later developed display device for outputting determined information. The display 1210 may act as an interface for the user to see the functioning of the processor 1202, or specifically as an interface with the software stored in the memory 1204 or in the drive unit 1206.

Additionally or alternatively, the computer system 1200 may include an input device 1212 configured to allow a user to interact with any of the components of system 1200. The input device 1212 may be a number pad, a keyboard, or a cursor control device, such as a mouse, or a joystick, touch screen display, remote control, or any other device operative to interact with the computer system 1200.

The computer system 1200 may also or alternatively include a disk or optical drive unit 1206. The disk drive unit 1206 may include a computer-readable medium 1222 in which one or more sets of instructions 1224, e.g. software, can be embedded. Further, the instructions 1224 may embody one or more of the methods or logic as described herein. The instructions 1224 may reside completely or partially within the memory 1204 and/or within the processor 1202 during execution by the computer system 1200. The memory 1204 and the processor 1202 also may include computer-readable media as discussed above.

In some systems, a computer-readable medium 1222 includes instructions 1224 or receives and executes instructions 1224 responsive to a propagated signal so that a device connected to a network 1270 can communicate voice, video, audio, images, or any other data over the network 1270. Further, the instructions 1224 may be transmitted or received over the network 1270 via a communication port or interface 1220, and/or using a bus 1208. The communication port or interface 1220 may be a part of the processor 1202 or may be a separate component. The communication port 1220 may be created in software or may be a physical connection in hardware. The communication port 1220 may be configured to connect with a network 1270, external media, the display 1210, or any other components in system 1200, or combinations thereof. The connection with the network 1270 may be a physical connection, such as a wired Ethernet connection or may be established wirelessly as discussed below. Likewise, the additional connections with other components of the system 1200 may be physical connections or may be established wirelessly. The network 1270 may alternatively be directly connected to the bus 1208.

While the computer-readable medium 1222 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 1222 may be non-transitory, and may be tangible.

The computer-readable medium 1222 can include a solid-state memory such as a memory card or other package that houses one or more non-volatile read-only memories. The computer-readable medium 1222 can be a random-access memory or other volatile re-writable memory. Additionally or alternatively, the computer-readable medium 1222 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 1200 may be connected to one or more networks 1270. The network 1270 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 1270 may include wide area networks (WAN), such as the Internet, local area networks (LAN), campus area networks, metropolitan area networks, a direct connection such as through a Universal Serial Bus (USB) port, or any other networks that may allow for data communication. The network 1270 may be configured to couple one computing device to another computing device to enable communication of data between the devices. The network 1270 may generally be enabled to employ any form of machine-readable media for communicating information from one device to another. The network 1270 may include communication methods by which information may travel between computing devices. The network 1270 may be divided into sub-networks. The sub-networks may allow access to all of the other components connected thereto or the sub-networks may restrict access between the components. The network 1270 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for dynamic routing of electronic transactions, comprising:
    receiving a request message from a point-of-sale (POS) system;
    transmitting the request message to a downstream entity, wherein temporal data associated with the transmission of the request message is stored in a database;
    receiving a first response message corresponding to the request message from the downstream entity, wherein the first response message includes an initial destination processor identifier;
    determining an initial destination processor is unsuccessful in processing the request message due to a connectivity error or a processor error;
    parsing the request message to determine a routing directive associated with the request message, wherein a plurality of routing parameters are generated for configuring the routing directive, and wherein the plurality of routing parameters include a message type, a routing directive type, an error type, and a destination selection criteria;
    retrieving contextual data based on the routing directive, wherein the contextual data includes a response time threshold and an error rate threshold for one or more destination processors;
    training a machine learning model based on a set of training data to determine an appropriate destination processor, wherein the set of training data includes contextual data for a plurality of request messages;
    determining, via the machine learning model, a final destination processor based on the routing directive and the contextual data of the request message, wherein the final destination processor is different from the initial destination processor;
    updating the initial destination processor identifier of the request message to a final destination processor identifier based on the final destination processor;
    transmitting the updated request message to the downstream entity, wherein temporal data associated with the transmission of the updated request message is stored in the database; and
    receiving a second response message corresponding to the updated request message from the downstream entity indicating a processing status of the updated request message by the final destination processor.

2. The method of claim 1, wherein updating the request message comprises:
    altering a message payload to update a message destination to the final destination processor.

3. The method of claim 2, wherein updating the message destination to the final destination processor further comprises:
    determining the final destination processor is unsuccessful in processing the updated request message; and
    re-updating and re-routing the updated request message to another destination processor.

4. The method of claim 1, wherein the contextual data further comprises at least one of:
    status data associated with a plurality of payment processors; and
    status data associated with connections to the plurality of payment processors.

5. The method of claim 4, wherein the status data associated with the plurality of payment processors comprise at least one of:
    a status code indicating that a payment processor is unresponsive;
    a status code indicating that the payment processor is unable to process the request message; and
    a status code indicating that a service at a payment process is unavailable.

6. The method of claim 4, wherein the status data associated with the connection to the plurality of payment processors comprise at least one of:
    a status code indicating a connection failure to a payment processor; and
    a status code indicating a connection timeout.

7. The method of claim 1, wherein the routing directive is configured by a user via a web-based portal.

8. The method of claim 1, wherein the routing directive comprises one of:
    an error-based routing directive; and
    a non-error-based routing directive.

9. The method of claim 8, wherein the error-based routing directive comprises:
    a status code; and
    the destination selection criteria.

10. The method of claim 9, wherein the destination selection criteria comprise one or more of:
- a response time;
- an approval rate;
- a connectivity error rate; and
- a processor error rate.

11. The method of claim 10, wherein the destination selection criteria further comprise a time window.

12. The method of claim 1, wherein the final destination processor is selected from a plurality of candidate destination processors associated with the POS system.

13. The method of claim 12, wherein the plurality of candidate destination processors associated with the POS system are configured by a user via a web-based portal.

14. The method of claim 1, wherein the request message is an application programming interface (API) request.

15. The method of claim 1, wherein the downstream entity is a payment gateway.

16. The method of claim 1, further comprising:
splitting, via the machine learning model, a routing of the updated request message between a plurality of candidate destination processors based, at least in part, on the contextual data, wherein the contextual data indicates anticipated message volume during a specific time-period for the plurality of candidate destination processors.

17. A non-transitory computer readable medium for dynamic routing of electronic transactions, the non-transitory computer readable medium storing instructions that, when executed by one or more processors, cause the one or more processors to perform a method comprising:
receiving a request message from a point-of-sale (POS) system;
transmitting the request message to a downstream entity, wherein temporal data associated with the transmission of the request message is stored in a database;
receiving a first response message corresponding to the request message from the downstream entity, wherein the first response message includes an initial destination processor identifier;
determining an initial destination processor is unsuccessful in processing the request message due to a connectivity error or a processor error;
parsing the request message to determine a routing directive associated with the request message, wherein a plurality of routing parameters are generated for configuring the routing directive, and wherein the plurality of routing parameters include a message type, a routing directive type, an error type, and a destination selection criteria;
retrieving contextual data based on the routing directive, wherein the contextual data includes a response time threshold and an error rate threshold for one or more destination processors;
training a machine learning model based on a set of training data to determine an appropriate destination processor, wherein the set of training data includes contextual data for a plurality of request messages;
determining, via the machine learning model, a final destination processor based on the routing directive and the contextual data of the request message, wherein the final destination processor is different from the initial destination processor;
updating the initial destination processor identifier of the request message to a final destination processor identifier based on the final destination processor;
transmitting the updated request message to the downstream entity, wherein temporal data associated with the transmission of the updated request message is stored in the database; and
receiving a second response message corresponding to the updated request message from the downstream entity indicating a processing status of the updated request message by the final destination processor.

18. The non-transitory computer readable medium of claim 17, wherein the downstream entity is a payment gateway.

19. The non-transitory computer readable medium of claim 17, wherein updating the request message comprises:
altering a message payload to update a message destination to the final destination processor.

20. A system for dynamic routing of electronic transactions, the system comprising:
one or more processors;
a non-transitory computer readable medium storing instructions that, when executed by the one or more processors, cause the one or more processors to perform a method comprising:
receiving a request message from a point-of-sale (POS) system;
transmitting the request message to a downstream entity, wherein temporal data associated with the transmission of the request message is stored in a database;
receiving a first response message corresponding to the request message from the downstream entity, wherein the first response message includes an initial destination processor identifier;
determining an initial destination processor is unsuccessful in processing the request message due to a connectivity error or a processor error;
parsing the request message to determine a routing directive associated with the request message, wherein a plurality of routing parameters are generated for configuring the routing directive, and wherein the plurality of routing parameters include a message type, a routing directive type, an error type, and a destination selection criteria;
retrieving contextual data based on the routing directive, wherein the contextual data includes a response time threshold and an error rate threshold for one or more destination processors;
training a machine learning model based on a set of training data to determine an appropriate destination processor, wherein the set of training data includes contextual data for a plurality of request messages;
determining, via the machine learning model, a final destination processor based on the routing directive and the contextual data of the request message, wherein the final destination processor is different from the initial destination processor;
updating the initial destination processor identifier of the request message to a final destination processor identifier based on the final destination processor;
transmitting the updated request message to the downstream entity, wherein temporal data associated with the transmission of the updated request message is stored in the database; and
receiving a second response message corresponding to the updated request message from the downstream entity indicating a processing status of the updated request message by the final destination processor.

\* \* \* \* \*